(12) United States Patent
Guha et al.

(10) Patent No.: US 10,471,668 B2
(45) Date of Patent: Nov. 12, 2019

(54) VACUUM MOLDING OF THERMOSET SHEET ARTICLES

(71) Applicant: CONTINENTAL STRUCTURAL PLASTICS, INC., Auburn Hills, MI (US)

(72) Inventors: Probir Kumar Guha, Troy, MI (US); Mayur S. Shah, Rochester Hills, MI (US); Kim Robert Hamner, Auburn Hills, MI (US)

(73) Assignee: Continental Structural Plastics Inc., Auburn Hills, MI (US)

( * ) Notice: Subject to any disclaimer, the term of this patent is extended or adjusted under 35 U.S.C. 154(b) by 251 days.

(21) Appl. No.: 14/764,393

(22) PCT Filed: Jan. 29, 2014

(86) PCT No.: PCT/US2014/013595
§ 371 (c)(1),
(2) Date: Jul. 29, 2015

(87) PCT Pub. No.: WO2014/120767
PCT Pub. Date: Aug. 7, 2014

(65) Prior Publication Data
US 2015/0360425 A1    Dec. 17, 2015

Related U.S. Application Data

(60) Provisional application No. 61/758,114, filed on Jan. 29, 2013.

(51) Int. Cl.
*B29C 70/46* (2006.01)
*B29C 43/02* (2006.01)
(Continued)

(52) U.S. Cl.
CPC ............ *B29C 70/467* (2013.01); *B29C 43/02* (2013.01); *B29C 43/3607* (2013.01);
(Continued)

(58) Field of Classification Search
CPC . B29C 70/467; B29C 2043/563; B29C 43/02; B29C 2043/503; B29C 2043/5833;
(Continued)

(56) References Cited

U.S. PATENT DOCUMENTS 3,840,239 A    10/1974    Fazekas et al.
4,081,578 A    3/1978    van Essen et al.
(Continued)

FOREIGN PATENT DOCUMENTS

EP    0320914 A2    6/1989
JP    0911262 A    1/1997
(Continued)

OTHER PUBLICATIONS

English Translation of JPH106354. Takezaki Hideaki. Jan. 13, 1998.*
(Continued)

*Primary Examiner* — Matthew J Daniels
*Assistant Examiner* — Hana C Page
(74) *Attorney, Agent, or Firm* — Avery N. Goldstein; Blue Filament Law PLLC

(57) ABSTRACT

A process of compression molding an article from a curable resin is provided that includes opening a mold to an open position by displacing an upper die having an upper mold surface from a lower die having a lower mold surface. Resin is placed a mold surface and the dies are closed to an intermediate start position at a rate of from 1 to 10 cm/sec. The dies are then closed to a start position at a rate of between 25 and 60% of the rate of closure to the intermediate position. A shroud volume is evacuated for at least 3

(Continued)

seconds to a reduced pressure of less than 0.16 atmospheres while continuing to press toward a mold cavity volume at a rate of between 12 and 30% of the rate of closure to the intermediate start. The reduced pressure is removed as the full compression is applied.

7 Claims, 2 Drawing Sheets

(51) Int. Cl.
  *B29C 43/36*  (2006.01)
  *B29C 43/58*  (2006.01)
  *B29C 43/56*  (2006.01)
  B29L 31/00  (2006.01)
  B29L 31/30  (2006.01)
  B29C 43/50  (2006.01)
  B29K 105/12  (2006.01)
  B29K 101/10  (2006.01)
  B29K 105/08  (2006.01)

(52) U.S. Cl.
  CPC .............. *B29C 43/56* (2013.01); *B29C 43/58* (2013.01); *B29C 2043/503* (2013.01); *B29C 2043/563* (2013.01); *B29C 2043/5808* (2013.01); *B29C 2043/5833* (2013.01); *B29K 2101/10* (2013.01); *B29K 2105/08* (2013.01); *B29K 2105/0863* (2013.01); *B29K 2105/12* (2013.01); *B29L 2031/003* (2013.01); *B29L 2031/3005* (2013.01)

(58) Field of Classification Search
  CPC ......... B29C 70/46; B29C 43/56; B29C 43/58; B29K 2105/0863; B29K 2105/08

USPC ........................................................ 264/550

See application file for complete search history.

(56) References Cited

U.S. PATENT DOCUMENTS

| | | | |
|---|---|---|---|
| 4,488,862 A | 12/1984 | Epel et al. | |
| 4,551,085 A | 11/1985 | Epel et al. | |
| 4,612,149 A | 9/1986 | Iseler et al. | |
| 4,867,924 A | 9/1989 | Schilkey et al. | |
| 5,795,510 A | 8/1998 | Matsumoto et al. | |
| 5,820,813 A | 10/1998 | Hara et al. | |
| 6,264,454 B1 * | 7/2001 | Hale ...................... | B29C 31/08 264/145 |
| 6,805,546 B2 | 10/2004 | Hahn et al. | |

FOREIGN PATENT DOCUMENTS

| | | | |
|---|---|---|---|
| JP | 106354 A | 1/1998 | |
| JP | 1095023 A | 4/1998 | |
| KR | 1020020010988 A | 2/2002 | |
| KR | 1020040047731 A | 6/2004 | |
| KR | 1020070004839 A | 1/2007 | |
| KR | 1020110120237 A | 11/2011 | |
| WO | WO1984004273 A1 * | 11/1984 | ............... B29C 1/02 |
| WO | 2011088461 A1 | 7/2011 | |

OTHER PUBLICATIONS

Supplementary European Search Report, dated Sep. 22, 2016, for Application No. EP 14 74 5862.

* cited by examiner

VACUUM MOLDING OF THERMOSET SHEET ARTICLES

RELATED APPLICATIONS

This application claims priority benefit of U.S. Provisional Application Ser. No. 61/758,114 filed Jan. 29, 2013; the contents of which are hereby incorporated by reference.

FIELD OF THE INVENTION

The present invention in general relates to the vacuum molding of thermoset articles and in particular to vacuum molding of such articles with reduced pitting and porosity.

BACKGROUND OF THE INVENTION

Compression molding is a technique for forming parts wherein a charge is placed between upper and lower heated die members defining a mold cavity. The dies are then brought to a closed position where the dies compress the charge causing it to flow and fill the mold cavity. After the thermoset resin cures, the molds are opened and the finished part removed.

Compression molding techniques have been used to make parts having a relatively flat surface, such as exterior automotive body panels. The charges used for making such articles include a thermosetting resin containing reinforcing fibers such as glass fibers, polyaramide fibers or carbon fibers and various fillers such as calcium carbonate and carbon black. A charge is often formed into a sheet molding compound (SMC). Compression molding has been limited in the articles that can be made owing to the inability to control porosity and pitting of the article surface that lead to paint defects and high scrap rates. It is commonly believed that such defective areas result primarily from degassing of trapped air that is trapped in the charge during molding.

The use of vacuum during the compression molding process improves the surface qualities of the article as detailed for example in U.S. Pat. Nos. 3,840,239; 4,488,862; and 6,805,546; yet surface finish problems continue to limit the articles that are efficiently formed through compression molding. In an effort to fix surface quality problems in-mold coating techniques have been explored as detailed for example, in U.S. Pat. No. 4,081,578. This method employs an additional processing step where the cured article remains in the mold and is coated with a composition that spreads and penetrates the surface to fill surface defects. This corrective technique met with limited acceptance owing to lower throughput and environmental weathering concerns.

Compression molding and corrective in-mold coating become even more difficult as articles become more three dimensional in contours, along with greater differentials in article thickness throughout the part associated with ribs, bosses and other projections.

A conventional process of compression molding a sheet molding compound uses heated dies which when closed form a mold. The compound is placed in the mold cavity when the dies are open and the dies are moved closer to one another to form a partially closed position to engage a vacuum seal sheath that includes the mold cavity and surrounding area to form a vacuum chamber, without the upper die contacting compound contained within the mold cavity. The vacuum chamber is then typically evacuated to a reduced pressure of less than 7 inches of mercury absolute (24 kPa) followed by closing the dies to a fully closed condition. Upon fully closing the dies to define the mold cavity, the sheet molding compound spread to fill the mold. The mold cavity is then returned to atmospheric pressure while the molding pressure is maintained on the part during the remainder of the curing cycle. After the part is thoroughly cured, the dies are opened allowing the removal of the finished part. This approach has proven only partially effective in controlling article surface porosity and pitting.

Thus, there exists a need for a process of vacuum compression molding that controls the rate of movement of the molding dies relative to another and vacuum pressure to provide for kinetically controlled degassing during compression molding to afford improved molded article surface quality.

SUMMARY OF THE INVENTION

A process of compression molding an article from a thermoset charge containing a curable resin is provided that includes opening a mold to an open position by displacing an upper die having an upper mold surface from a lower die having a lower mold surface. The dies upon full compression define a mold cavity complementary to the article to be molded. A charge of thermoset resin, with or without reinforcing fibers, is placed onto one of the lower mold surface or the upper mold surface and the dies are rapidly closed to an intermediate start position of 5 to 10 cm at a rate of from 1 to 10 cm/sec. The dies are then slowly closed from the intermediate start position to a start position at a rate of between 25 and 60% of the rate of closure to the intermediate position. The still as yet not completely closed mold cavity is evacuated within a shroud volume for at least 3 seconds to a reduced pressure of less than 0.16 atmospheres (16.2 kPa) while continuing to press the upper die and the lower die toward a volume of the mold cavity at a rate of between 12 and 30% of the rate of closure to the intermediate start. The reduced pressure is removed as the full compression is applied. The charge is allowed to cure in the mold cavity and thereafter the mold cavity is opened and the article removed. A sheet molding composition (SMC) with one or more plies is used in certain embodiments as the charge.

DETAILED DESCRIPTION OF THE INVENTION

The present invention has utility as a process of compression molding of an article with the use of vacuum to finally address the incidence of surface porosity and imperfections that remain common problems in the art. Through a controlled sequence of die movements and vacuum strength reliably high quality moldings occur.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 1:
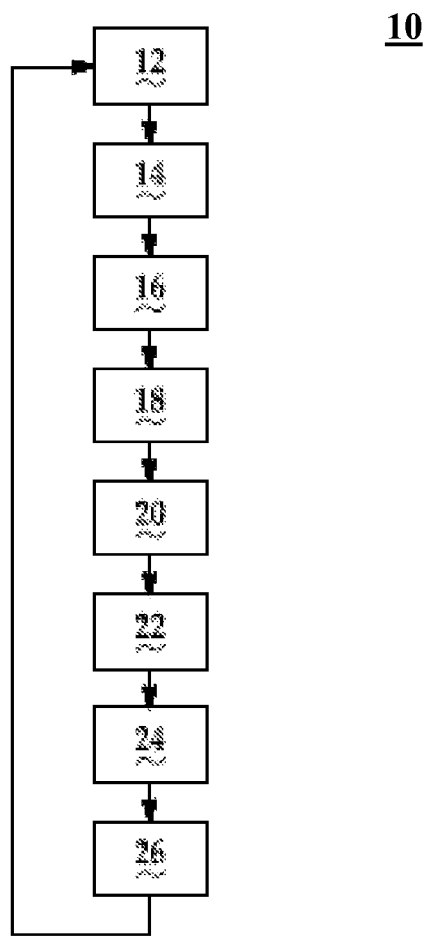
FIG. 1 is a flow diagram illustrating the basic steps of an inventive process.
Figure 2A:
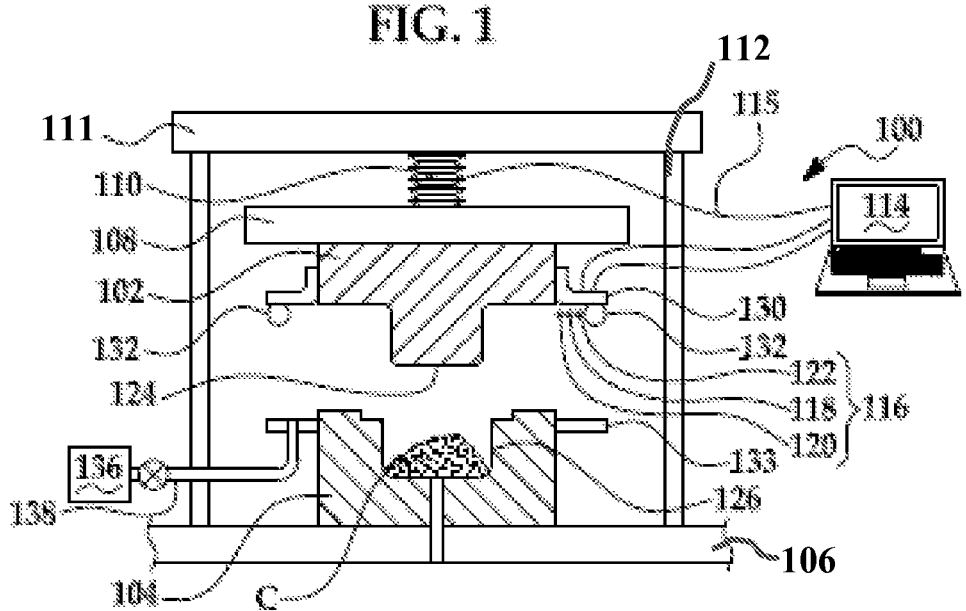
FIGS. 2A-2D are cross-sectional views of the mold during various stages in the inventive molding process.

An inventive process is depicted schematically at 10 in FIG. 1. As represented in Step 12 of FIG. 1 and referring to FIG. 2A-2D, a first general step is to open a compression mold to atmosphere. The mold is as shown generally at 100 in FIG. 2A, where like reference numeral used in subsequent figures have the meaning ascribed thereto in the specification. Mold 100 has an upper die 102 and a lower die 104. Lower die 104 is mounted on a stationary surface 106. Upper die 102 is connected to a movable platen 108 operating under the action of a ram 110 such as a hydraulic pneumatic actuator to control the displacement and forces exerted on dies 102 and 104. The ram 110 moves relative to a fixed frame plate 111 supported by posts 112. A critical aspect of the present invention is the ability to control the speed of the movement of die 102 in a programmed manner. A computer controller 114 receiving feedback from sensors 116 is particularly well suited to form compression molded articles according to the present invention by sending control signals 115 to the ram 110. Sensors 116 include at least one of a vacuum gauge 118, position gauge 120, or a mold compression force gauge 122; or a combination thereof.

The upper die 102 as depicted has a male molding surface 124 and the complementary lower die 104 has a female molding surface 126. Molding surfaces 124 and 126 when brought into minimal proximity by the ram 110 define a mold cavity 128 having a shape corresponding to the article A being from a charge C. The upper die 102 has an upper die flange 130 supporting one part of a vacuum seal that is depicted herein as a vacuum gasket 132. A complementary flange 133 is mounted to lower die 104 that on contact with gasket 132 forms a volume 134. The volume 134 is in gaseous communication with a vacuum pump 136 by way of a tube 138. In some embodiments, a pin 140 (see FIG. 2D) is recessed into the lower die 104. It is appreciated that the relative position of the male/female portions of the mold cavity 128 are readily inverted between the upper die 102 and lower die 104. Likewise, the gasket 132 is readily placed on the lower flange 133 to form a vacuum seal with a complementary upper die flange 130. The mold cavity 128 is configured to form an article illustratively including exterior automotive body panels such as hoods, deck lids, roofs, doors, and spoilers.

The present invention is further detailed with respect to mold cavity in which the molding surface 124 has a surface area of one square meter ($m^2$) and a volume 134 of 0.01 cubic meters ($m^3$). The distances and rate of die movement generally scale with proportion to the volume of the volume 134. [please confirm]. The following rates and vacuum tolerances are well suited for articles having a surface area of between 0.2 and 3.0 $m^2$.

In the open position, dies 102 and 104 are spaced apart a sufficient distance to allow a charge C to be placed on the molding surface 126 of the lower die 104 as represented by step 12 of FIG. 1. The open position of the mold is typically 15 to 30 centimeters (cm) displaced between flanges 130 and 133. As used herein a "charge" is defined as a material containing a resin that cures to a rigid, solid state. The resin that may be used may be any material that provides the necessary bonding and strength for the composite article to be formed. Among typical resins are polyesters, vinyl esters, novalacs and epoxies. The present invention in certain embodiments is used for compression molding charges in the form of one or more sheets of sheet molding compound (SMC) material. In other embodiments, bulk molding compound (BMC) material represents another type of charge operative herein. SMC material includes a thermosetting resin mixed with reinforcing fibers and various fillers to form a semi-solid sheet or ply that can be cut into desired shapes and placed into the mold. Typical fibers include polyimide fibers, polyester fibers, polyamide fibers, natural fibers and metal fibers. Commercially available SMC material include TCA® available from Continental Structural Plastics, Inc.

A charge C in the form of an SMC takes the form of at least one sheet of SMC material. The one or more sheets of charge C are laid on molding surface 126 so that the charge covers 30%-90% of the total surface of molding surface 126. It is appreciated that the thickness, weight, and placement of the charge on the molding surface 126 will vary depending upon the configuration of the desired article. It is also appreciated that the at least one sheet of SMC is formed from one or more plies.

Figure 2B:
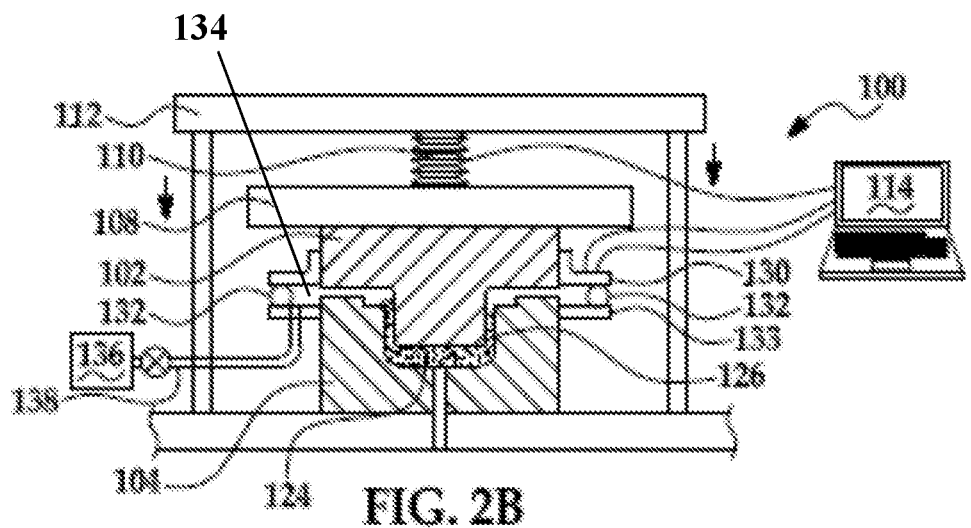

At step 14 of FIG. 1, the upper mold 102 is rapidly closed to an intermediate start position of 5 to 10 cm at a rate of from 1 to 10 cm/sec. The intermediate close is characterized by contact between the gasket 132 and the flange 133 to form a sealed shroud volume 134, as shown in FIG. 2B. In certain embodiments, the intermediate start is achieved in at a rate of 2 to 4 cm/sec.

Between steps 14 and 16 of FIG. 1, the dies 102 and 104 continues to close continuously to a slow close start position at a rate of between 25 and 60% of the rate of closure to the intermediate position at step 14. During the transition between steps 14 and 16 the vacuum is initiated and persists for approximately 3 to 10 seconds. According to the present invention, the vacuum in the shroud volume 134 is less than 25 inches mercury (0.16 atmospheres) (16.2 kPa), where ideal vacuum at standard temperature and pressure would be 29.92 inches mercury (1 atmospheres) (101 kPa). According to the present invention, this vacuum is maintained for at least 3 seconds before full ram tonnage is applied to the mold cavity 128. It is appreciated that this time extends beyond the step 16. According to the present invention, the vacuum is maintained at 25 inches mercury (16.2 kPa) vacuum until the mold is within 1 cm or less of complete closure to closed mold cavity 128.

Figure 2C:
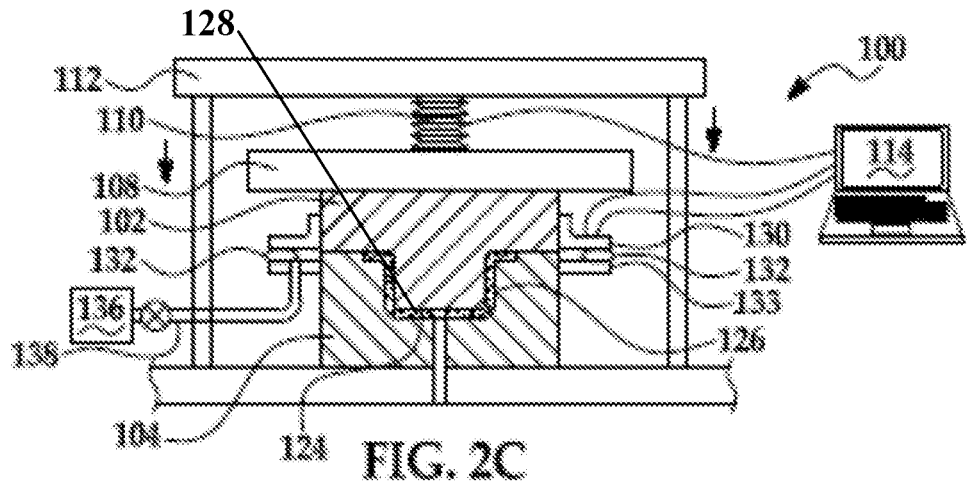
Figure 2D:
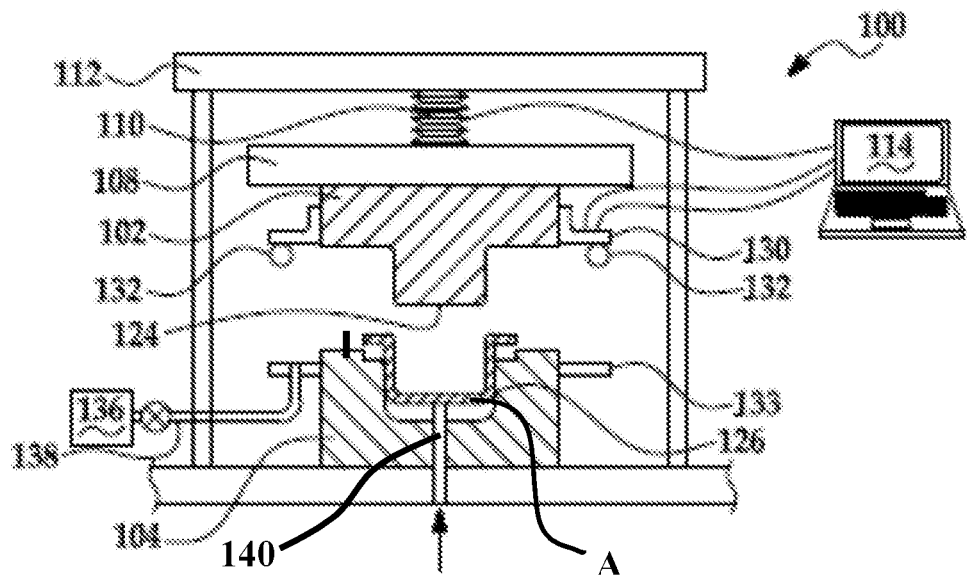

Between steps 16 and 18, the gasket 132 is compressed to a closed mold cavity 128 to a full closure position, as shown in FIG. 2C. The rate of movement of the upper die 102 to the full closure position is at a rate of between 12 and 30% of the rate of closure to the intermediate position at step 14. As the mold attains closed mold cavity minimum volume 128, the vacuum is vented upon full tonnage being applied to the mold cavity 128.

The mold cavity 128 is maintained under compression molding conditions and at a temperature to induce cure of the charge C at step 20. Typical cure times in mold cavity 128 at full tonnage typically range from 30 to 90 seconds. It is appreciated that the nature of the thermoset resin and article dimensions are factors that illustratively affect cure time in during full tonnage as shown at step 18 in FIG. 1 and in FIG. 2C. Typical cure conditions are temperatures of 140-180° C. and pressures of 20 to 200 atm (2026 kPa to 20260 kPa).

Subsequent to cure, the mold cavity 128 is opened with a rate of between −12 and −30% of the rate of closure to the intermediate position at step 14 to a partially opened position at step 22. It is appreciated that the rate of molding opening after cure is not critical and largely dictated by desired throughput and equipment wear considerations. The mold is then rapidly returned to a fully open position 12. If a pin 140 is present, the pin 140 is projected from the mold surface 126 to remove a completed article A from contact with the mold surface 126 at step 24. The pin 140 is returned to a retracted position at step 26, and the mold cycle completed. Typical molding cycle time is between 50 to 80 seconds.

Articles molded according to the present invention have a minimal amount of porosity and surface defects. An article upon removal from the mold cavity is amenable to further processing illustratively including trimming, sanding, priming, and painting to afford an article with a superior finish as illustrated in the following non-limiting examples.

Comparative Example A

A production run of vehicle hoods are produced according to a conventional vacuum modeling technique of U.S. Pat. No. 4,488,862 using a vacuum having a strength of 20 inches Mercury (68 kPa). Surface porosity defects averaged 122 defects per 1000 vehicle hoods.

Example 1

A production run of vehicle hoods are produced by an inventive process with surface porosity defects averaging 33 defects per 1000 vehicle hoods.

Comparative Example B

A production run of vehicle fenders are produced according to a conventional vacuum modeling technique of U.S. Pat. No. 4,488,862 using a vacuum having a strength of 20 inches Mercury (68 kPa). Surface porosity defects averaged 381 defects per 1000 vehicle fenders.

Example 2

A production run of vehicle fenders are produced by an inventive process with surface porosity defects averaging 57 defects per 1000 vehicle fenders.

Patents and publications mentioned in the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A process of compression molding an automotive body part article from a sheet molding composition (SMC), comprising:
    opening a mold to an open position, said mold having an upper die having an upper mold surface and a lower die having a lower mold surface that upon full compression define a mold cavity complementary to the article;
    placing the SMC as a multiple ply charge on one of the lower mold surface or the upper mold surface;
    rapidly closing the upper die and the lower die from the open position to an intermediate start position of 5 to 10 cm at a rate of from 1 to 5 cm/sec;
    slowly closing the upper die and the lower die from the intermediate start position to a start position at a rate of between 25 and 50% of the rate of closure to the intermediate position and simultaneously initiating a vacuum to evacuate the mold cavity to a reduced pressure of less than 0.16 atmospheres (16.2 kPa);
    maintaining the vacuum on the mold cavity for at least a total of 3 seconds while continuing to press the upper die and the lower die toward a volume of the mold cavity at a rate of between 12 and 30% of the rate of closure to the intermediate start;
    removing the reduced pressure when the upper die and the lower die are within 1 centimeter of the volume of the mold cavity;
    allowing the curable resin to cure in the mold cavity; and
    opening the mold cavity and removing the article.

2. The process of claim 1 wherein the SMC has reinforcing fibers of glass, polyaramide, carbon, or a combination thereof.

3. The process of claim 1 wherein the mold cavity is evacuated for from 3 to 10 seconds.

4. The process of claim 1 further comprising returning the upper die to and the lower die to the open position with a cycle time of 50 to 80 seconds.

5. The process of claim 4 further comprising placing a new charge of the SMC on one of the lower mold surface or the upper mold surface.

6. The process of claim 1 wherein the open position is a separation of between 15 and 30 centimeters.

7. The process of claim 1 further comprising extending a pin from the lower mold surface to remove the article from contact with the lower mold surface.

* * * * *